US009803450B2

(12) United States Patent
Hardy et al.

(10) Patent No.: US 9,803,450 B2
(45) Date of Patent: Oct. 31, 2017

(54) USE OF OLIGO-QUATERNARY COMPOSITIONS TO INCREASE SCALE INHIBITOR LIFETIME IN A SUBTERRANEAN FORMATION

(71) Applicant: Ecolab USA Inc., Eagan, MN (US)

(72) Inventors: Julie Hardy, Missouri City, TX (US); Curtis Sitz, Katy, TX (US)

(73) Assignee: Ecolab USA Inc., St. Paul, MN (US)

( * ) Notice: Subject to any disclaimer, the term of this patent is extended or adjusted under 35 U.S.C. 154(b) by 524 days.

(21) Appl. No.: 13/899,631

(22) Filed: May 22, 2013

(65) Prior Publication Data

US 2014/0151048 A1  Jun. 5, 2014

Related U.S. Application Data

(60) Provisional application No. 61/650,202, filed on May 22, 2012.

(51) Int. Cl.
*E21B 37/06* (2006.01)
*C09K 8/52* (2006.01)

(52) U.S. Cl.
CPC ........... *E21B 37/06* (2013.01); *C09K 8/52* (2013.01)

(58) Field of Classification Search
CPC ........................................ C09K 8/52
See application file for complete search history.

(56) References Cited

U.S. PATENT DOCUMENTS 2,761,836 A    9/1956  Brown et al.
3,349,032 A   10/1967  Krieg
(Continued)

FOREIGN PATENT DOCUMENTS

WO    WO2007015090 A1   2/2007
WO    WO2007056393 A2   5/2007
WO    WO2013045906 A1   4/2013

OTHER PUBLICATIONS

Electrical Conductivity of Aqueous Solutions, Colorado State University, available at http://sites.chem.colostate.edu/diverdi/all_courses/CRC%20reference%20data/electrical%20conductivity%20of%20aqueous%20solutions.pdf (attached).*

(Continued)

*Primary Examiner* — Angela M DiTrani
*Assistant Examiner* — Anuradha Ahuja
(74) *Attorney, Agent, or Firm* — Senniger Powers LLP

(57) ABSTRACT

A method of inhibiting scale in a subterranean formation comprises pretreating the subterranean formation with a polyquaternary amine that serves as a squeeze life extension (SLE) agent, and then introducing a scale inhibitor pill into the subterranean formation, wherein the scale inhibitor pill includes one or more scale inhibitor compositions. For example, the polyquaternary amine may be a polymer having up to 5 quaternary amine centers, but is preferably a nonpolymeric diquaternary amine having a molecular weight of from 250 to 500. One such example is 1,3-propandiaminium, 2-hydroxy-N,N,N,N',N',N'-hexamethyl-, dichloride. The SLE agent is preferably introduced into the formation in a brine solution having a concentration from 0.1 to 20 weight percent. The SLE agents may be used with a variety of known scale inhibitors and scale inhibitor chemistries.

27 Claims, 4 Drawing Sheets

(56) References Cited

U.S. PATENT DOCUMENTS

| | | | | |
|---|---|---|---|---|
| 3,584,687 | A * | 6/1971 | Stanford | C09K 8/528 166/275 |
| 4,493,771 | A * | 1/1985 | Wilson | C07F 9/3817 210/700 |
| 5,038,861 | A * | 8/1991 | Shuler | C09K 8/528 166/279 |
| 5,181,567 | A | 1/1993 | Shuler | |
| 5,354,477 | A * | 10/1994 | Rush | C02F 1/26 210/708 |
| 5,360,065 | A * | 11/1994 | Falk | C09K 8/528 166/250.05 |
| 5,655,601 | A * | 8/1997 | Oddo | C09K 8/528 166/279 |
| 6,921,742 | B2 | 7/2005 | Smith | |
| 2002/0150499 | A1* | 10/2002 | Reizer | C02F 5/12 422/12 |
| 2005/0250666 | A1 | 11/2005 | Gatlin et al. | |
| 2012/0138303 | A1* | 6/2012 | Welton | C09K 8/032 166/300 |

OTHER PUBLICATIONS

CRC Handbook of Chemistry & Physics; W.M.Haynes; 93rd Edition 2012-2013; Section 5-71.*

PCT/US2013/042135—"PCT International Search Report and Written Opinion", Jul. 17, 2013, 13 pages. (This PCT application is related to the present U.S. Appl. No. 13/899,631).

* cited by examiner

USE OF OLIGO-QUATERNARY COMPOSITIONS TO INCREASE SCALE INHIBITOR LIFETIME IN A SUBTERRANEAN FORMATION

CROSS-REFERENCE TO RELATED APPLICATIONS

This application claims the benefit of U.S. Provisional Application No. 61/650,202 filed on May 22, 2012.

BACKGROUND OF THE INVENTION

Field of the Invention

The present invention relates to methods and compositions for inhibiting scale, and relates more particularly to methods and compositions for extending the lifetime of a scale inhibitor treatment in a subterranean formation.

Background of the Related Art

The scale inhibitor squeeze treatment is a well-known method that is widely used in the oilfield to prevent mineral scale formation. Squeeze lifetimes are dependent on a number of factors. Some of these factors are reservoir temperature, brine composition, reservoir mineralogy, and scale inhibitor chemistry. In an attempt to reduce the number of squeeze treatments in a given well, and thereby simplify the logistics and improve the economics of the treatment, modifications to the treatment procedures have been developed that are targeted at extending squeeze lifetimes. The improved performance of scale inhibitor squeeze treatments, coupled with increased squeeze lifetimes, is especially important for critical applications in environmentally sensitive areas.

In situ adjustments to the reservoir brine pH, supplementation with calcium or zinc ions, addition of microcrystalline kaolin, and the incorporation of chemical bridging agents have been used with varying degrees of success. These methods, while offering a degree of squeeze life enhancement, are not without their drawbacks. Methods involving pH adjustment or calcium ion supplementation create the opportunity for damage caused by excessive precipitation of solids. The injection of microcrystalline kaolin can be troublesome in that solids are intentionally introduced into the formation and could lead to plugging of pore throats within the porous medium of the targeted subterranean petroliferous formation. Many chemical bridging agents have temperature limitations restricting their use to a few select reservoirs or have undesirable environmental profiles.

The scale inhibitor squeeze treatment has long been an important tool in the efficient prevention of mineral scale deposition in the surface hardware, in the wellbore and in the reservoir. Once completed, the scale inhibitor squeeze requires no regular maintenance, other than the occasional measurement of residual chemical. Scale squeeze treatments can provide protection from mineral deposition for months after the treatment and, in some cases, even years after the treatment.

Scale squeeze life extension has been an important area of investigation for a number of reasons. Fewer squeeze treatements result in less money being spent on chemicals and the associated costs of the manpower and equipment needed to apply the treatment. Fewer days out of service means that the well continues producing oil or gas. Performing fewer squeeze treatments may also mean that less chemical is released into the environment and there are fewer opportunities for spills and other accidents.

The scale squeeze injection typically comprises three steps in its application. The first step is a Spearhead, alternatively referred to as a Preflush, that prepares the wellbore and reservoir for the treatment. The second step is a Scale Inhibitor Pill, alternatively referred to as a Main Pill, which contains the scale inhibitor. The third step is an Overflush, which distributes the scale inhibitor over a larger volume of reservoir.

For aqueous scale squeeze treatments, the Spearhead fluid may be, for example, clean, filtered, produced brine, or brine prepared by adding inorganic salts, such as KCl or $NH_4Cl$ to water, or filtered seawater. The Spearhead fluid may also contain one or more additives, such as surfactants, emulsion preventers, mutual solvents, oxygen scavengers, corrosion inhibitors or biocides, and in some cases Squeeze Life Extension agents. These additives prepare and condition the wellbore and reservoir for the subsequent Scale Inhibitor Pill that contains the scale inhibitor.

The Spearhead and Scale Inhibitor Pill are typically prepared by what is known as batch mixing. For the Spearhead, the entire volume of brine is contained in a portable tank and the Preflush additives are mixed into the brine. Similarly, the entire volume of brine for the Scale Inhibitor Pill is contained in a separate portable tank, and the scale inhibitor(s) are added into it and mixed well. A suitable pump is then used to sequencially inject the fluids into the wellbore. In some cases, the Spearhead and Main Pills are prepared "on the fly", whereby brine is pumped from a source, the chemical additives are injected into the flowing brine, and the chemical additives are mixed into the brine by means of a static mixer or other mechanical device before entering the wellbore.

BRIEF SUMMARY OF THE INVENTION

One embodiment of the presently claimed invention provides a method of inhibiting scale in a subterranean formation. The method comprises pretreating the subterranean formation with a polyquaternary amine, and then introducing a scale inhibitor pill into the subterranean formation, wherein the scale inhibitor pill includes one or more scale inhibitor composition.

DETAILED DESCRIPTION OF THE INVENTION

Figure 1:
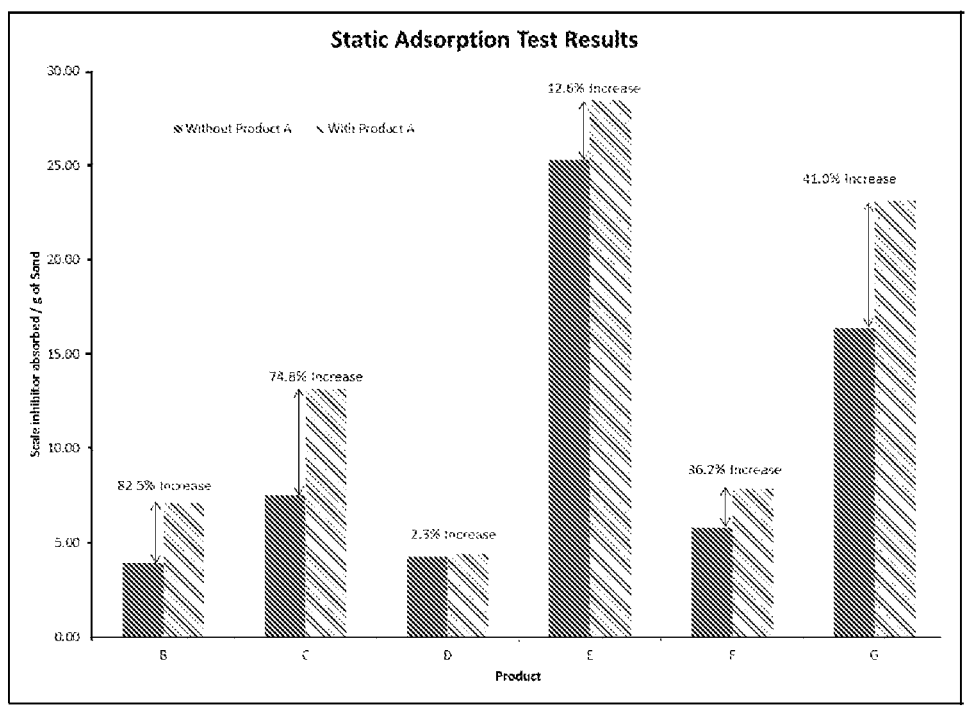
FIG. 1 is a bar graph of the amount of scale inhibitors (Products B through G) that were absorbed on sand with and without Product A.

One embodiment of the presently claimed invention provides a new class of squeeze life extention (SLE) agents. These new SLE agents are polycationic organic compounds. As used herein, the term "polycationic" means that the compounds include two or more cationic sites. The specific examples of the new SLE agents disclosed herein are all quaternary amines, having been prepared in the form of nonpolymeric diquaternary amines having a molecular weight of from about 250 to at least about 3500. It should be noted that quaternary amines are positively charged, i. e., cations. It is not common for cations to exist in nature in greater than sub-nano-particle aggregations without counter ions (i. e., anions) being attracted thereto to cause the net charge to be equal to or approaching zero. One of the definitions of a salt is the combination of cations with anions in proportions such that total a net charge that is or approaches zero; therefore, the mention of quaternary amines is intended as a reference to quaternary amine salts. Alternatively, the polycationic organic compounds could include two or more cationic sites involving cationized nitrogen-, phosphorous-, or sulfur-containing compounds, or the polycationic organic compounds could include two or more cationic sites, one or more of which involves cationized nitrogen-containing compounds and one or more of which involves cationized phosphorous-, or sulfur-containing compounds, Another embodiment of the presently claimed invention provides a method of inhibiting scale in a subterranean formation. The method comprises pretreating the subterranean formation with a polyquaternary amine, and then introducing a scale inhibitor pill into the subterranean formation, wherein the scale inhibitor pill includes one or more scale inhibitor compositions.

The polyquaternary amine in accordance with the presently claimed invention is preferably a nonpolymeric diquaternary amine. Optionally, the nonpolymeric diquaternary amine is introduced into the formation in a brine solution having a nonpolymeric diquaternary amine concentration of from 0.1 to 20 weight percent. The nonpolymeric diquaternary amine is preferably thermally stable to 180° C. Still further, the polyquaternary amine may be a polymer having from 1 to 5 quaternary amine centers. Examples of such polyquaternary amines having from 1 to 5 quaternary amine centers may be seen in the following non-limiting examples:

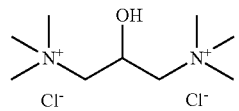

2-hydroxy-$N^1,N^1,N^1,N^3,N^3,N^3$-hexamethylpropane-1,3-diaminium chloride

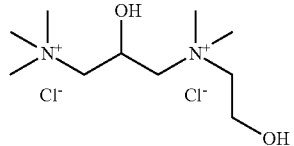

2-hydroxy-$N^1$-(2-hydroxyethyl)-$N^1,N^1,N^3,N^3,N^3$-pentamethylpropane-1,3-diaminium chloride

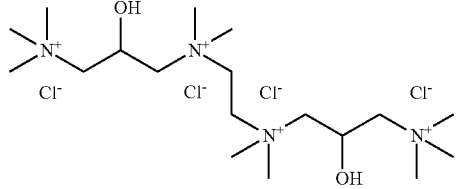

$N^1,N^{1'}$-(ethane-1,2-diyl)bis(2-hydroxy-$N^1,N^1,N^3,N^3,N^3$-pentamethylpropane-1,3-diaminium) chloride Three specific examples of nonpolymeric diquaternary amines, also referred to as bisquats, that serve as SLE agents include:

1,3-propandiaminium, 2-hydroxy-N,N,N,N',N',N'-hexamethyl-, dichloride;

1,3-propandiaminium, 2-hydroxy-N-(2-hydroxyethyl), N,N,N',N',N'-pentamethyl-, dichloride;

and 1,3-propandiaminium, 2-hydroxy-N,N-(2-hydroxylethyl), N,N',N',N'-tetramethyl-, dichloride.

These three diquaternary amines differ in the number of methyl groups that are attached to the two nitrogen atoms. For example, the composition of the hexamethyl-compound may be written as: $[(CH_3)_3N(CH_2)CHOH(CH_2)N(CH_3)_3]^+ 2Cl^-$. Diquaternary amines are considered to be symmetrical if there are an equal number of methyl groups on each of the two nitrogen atoms, as is the case with a hexamethyl compound. Diquaternary amines are considered to be non-symmetrical if there are an unequal number of methyl groups on each of the two nitrogen atoms, as is the case with a pentamethyl compound. The counter-ion to the quaternized N-, P-, or S-containing compounds specified in these examples is the chloride anion; however, any other anion could serve in the role of the counter-ion to the quaternized N-, P-, or S-containing compounds.

Other examples of oligomeric quaternary amines include derivatives of tertiary amines such as 1,1',1'',1'''-(ethane-1,2-diylbis(azanetriyl))tetrakis(propan-2-ol), available from Corsicana Technologies, Inc. of Houston, Tex., which intermediate may be reacted with any alkyl-, aryl-, aralkyl-, or alkaryl-halide via a reaction such as Reaction 1 illustrated below for simplicity in the chloride form:

Reaction 1

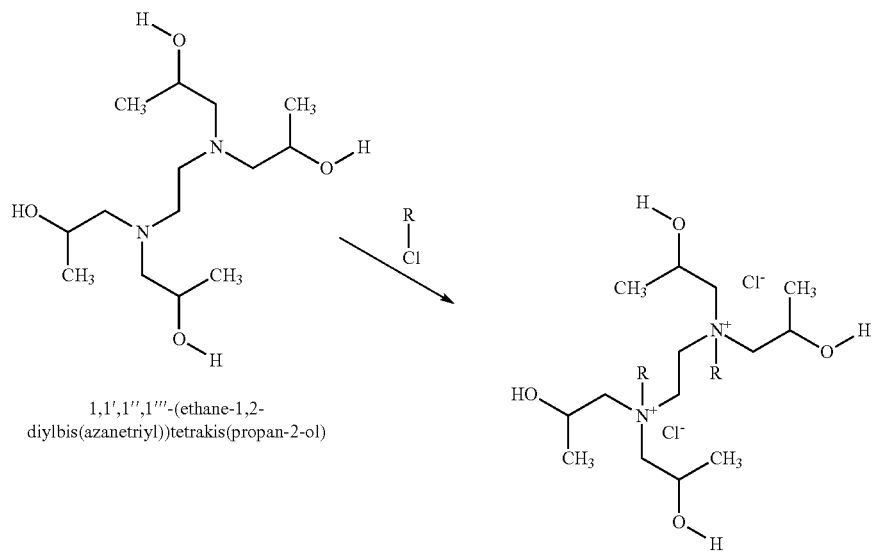

1,1',1'',1'''-(ethane-1,2-diylbis(azanetriyl))tetrakis(propan-2-ol)

The tertiary amines may be simple as shown in Reaction 5 or may be more complex, such as, for example, the tertiary amines such as 1,1',1'',1'''-(ethane-1,2-diylbis(azanetriyl))tetrakis(propan-2-ol) or 1,1',1'',1'''-((((2-hydroxypropyl)azanediyl)bis(ethane-2,1-diyl))bis(azanetriyl))tetrakis(propan-2-ol). Both tertiary amines are available from Corsicana Technologies, Inc. of Houston, Tex. The cations produced by such reactions are diquaternary ammonium cations or diamminium cations of molecular weight ranging from about 320 Daltons to well over 1500 Daltons, depending on the sizes of the alkyl groups. Reaction 1 is shown as a single step with both of the R-groups on the product salt having both nitrogens quaternized with the same R-group; but Reaction 1 can be carried out in two steps with a different R-group in each step. The salts shown in Reaction 1 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like.

Another set of examples of oligomeric quaternary amines include derivatives of tertiary amines such as 1,1',1'',1'''-((((2-hydroxypropyl)azanediyl)bis(ethane-2,1-diyl))bis(azanetriyl))tetrakis(propan-2-ol), available from Corsicana Technologies, Inc. of Houston, Tex., which intermediate can be reacted with any alkyl-, aryl-, arylalkyl-, or alkaryl-halide via a reaction such as Reaction 2 illustrated below for simplicity in the chloride form:

Reaction 2

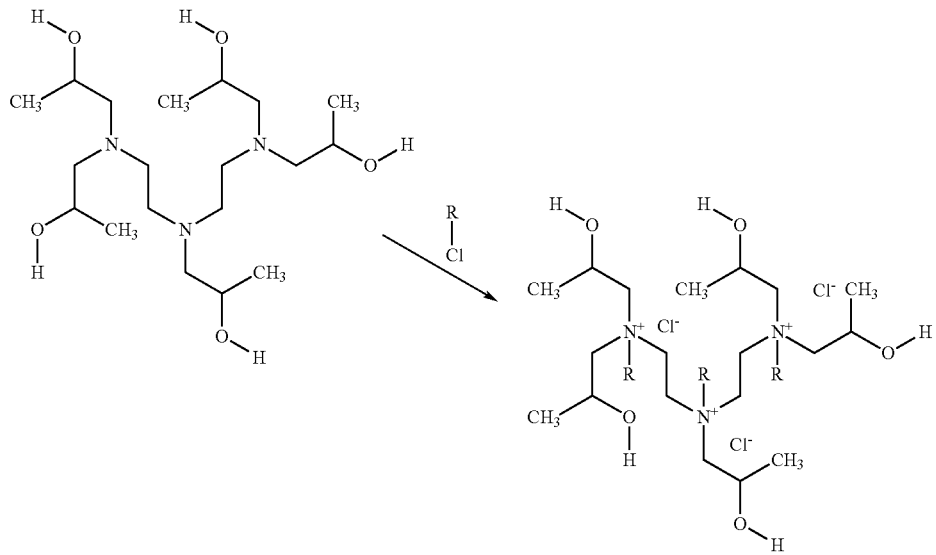

The tertiary amines may be simple as shown in Reaction 5 or may be more complex, such as, for example, the tertiary amines such as 1,1',1",1"'-(ethane-1,2-diylbis(azanetriyl))tetrakis(propan-2-ol) or 1,1',1",1"'-((((2-hydroxypropyl)azanediyl)bis(ethane-2,1-diyl))bis(azanetriyl))tetrakis(propan-2-ol). The cations produced by such reactions are diquaternary ammonium cations or diamminium cations of molecular weight ranging from about 430 Daltons to well over 2800 Daltons, depending on the size of the alkyl groups. Reaction 2 is shown as a single step with all three of the R-groups on the product salt having both nitrogens quaternized with the same R-group; but Reaction 2 can be carried out in three steps with the same or a different R-group in each step. The salts shown in Reaction 2 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like. Other polyquaternary amines within the scope of the presently claimed invention are those where the tertiary diamine or the tertiary triamine disclosed herein is replaced with other tertiary diamines, tertiary triamines, tertiary tetraamines, tertiary pentaamines, or tertiary hexaamines.

Yet other examples of oligomeric quaternary amines useful in accordance with the present invention include derivatives of alkyl dihalides such as 1,3-bis(3-chloropropyl)urea or 1-chloro-2-(3-chloro-2-methoxypropoxy)butane, available from Corsicana Technologies, Inc. of Houston, Tex., which intermediate can be reacted with any tertiary amine via a reaction such as Reactions 3 and 4 illustrated below in an exemplary version wherein the general tertiary amine is illustrated for simplicity as a trimethylamine:

Reaction 3

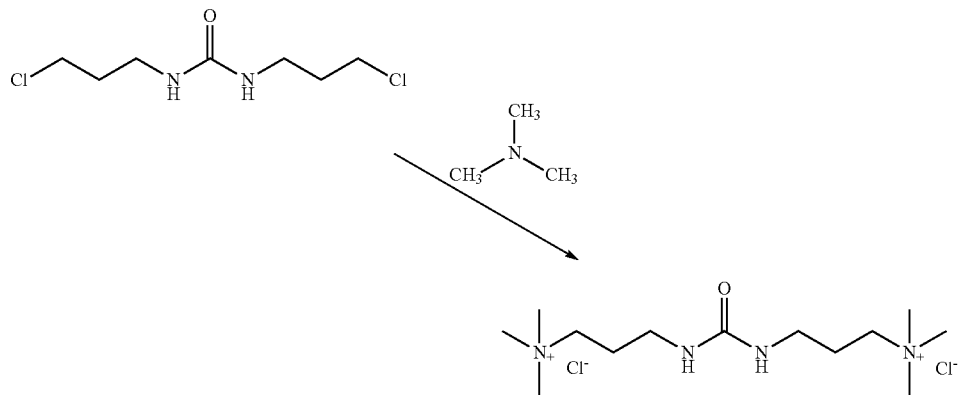

Reaction 4

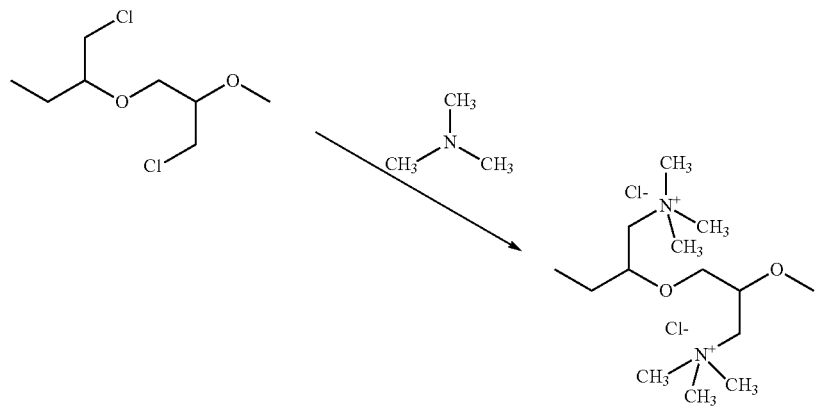

The tertiary amines may be simple as shown in Reactions 3 and 4 or may more complex, such as, for example, the tertiary amines such as 1,1',1",1"'-(ethane-1,2-diylbis(azanetriyl))tetrakis(propan-2-ol), or such as 1,1',1",1"'-((((2-hydroxypropyl)azanediyl)bis(ethane-2,1-diyl))bis(azanetriyl)) tetrakis(propan-2-ol), as disclosed herein. The cations produced by such reactions are triquaternary ammonium cations or triamminium cations of molecular weight ranging from about 260 Daltons to well over 1400 Daltons, depending on the alkyl groups' sizes. Reactions 3 and 4 are shown as a single step with both of the tertiary amine reagent groups being the same and leading to both nitrogens being quaternized in the same way; but Reactions 3 and 4 can be carried out in two steps with a different tertiary amine in each step. The salts shown in Reactions 3 and 4 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like.

Yet other examples of oligomeric quaternary amines useful in accordance with the presently claimed invention include derivatives of alkyl trihalides such as 1-chloro-2-(3-chloro-2-(3-chloro-2-methoxypropoxy)propoxy)butane, available from Corsicana Technologies, Inc. of Houston, Tex., which intermediate can be reacted with any tertiary amine via a reaction such as Reaction 5 illustrated below in an exemplary version wherein the general tertiary amine is illustrated for simplicity as a trimethylamine:

kis(propan-2-ol), as disclosed herein. The cations produced by such reactions are triquaternary ammonium cations or triamminium cations of molecular weight ranging from about 370 Daltons to well over 1500 Daltons, depending on the alkyl groups' sizes. Reaction 5 is shown as a single step with all three of the tertiary amine reagent groups being the same and leading to all three nitrogens being quaternized in the same way; but Reaction 5 can be carried out in three steps with a the same or a different tertiary amine in each step. The salts shown in Reaction 5 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like.

Yet other examples of oligomeric quaternary amines useful in accordance with the presently claimed invention include derivatives of alkyl tetrahalides such as 3,6,9,12-tetrakis(chloromethyl)-2,5,8,11-tetraoxatetradecane, available from Corsicana Technologies, Inc. of Houston, Tex.,

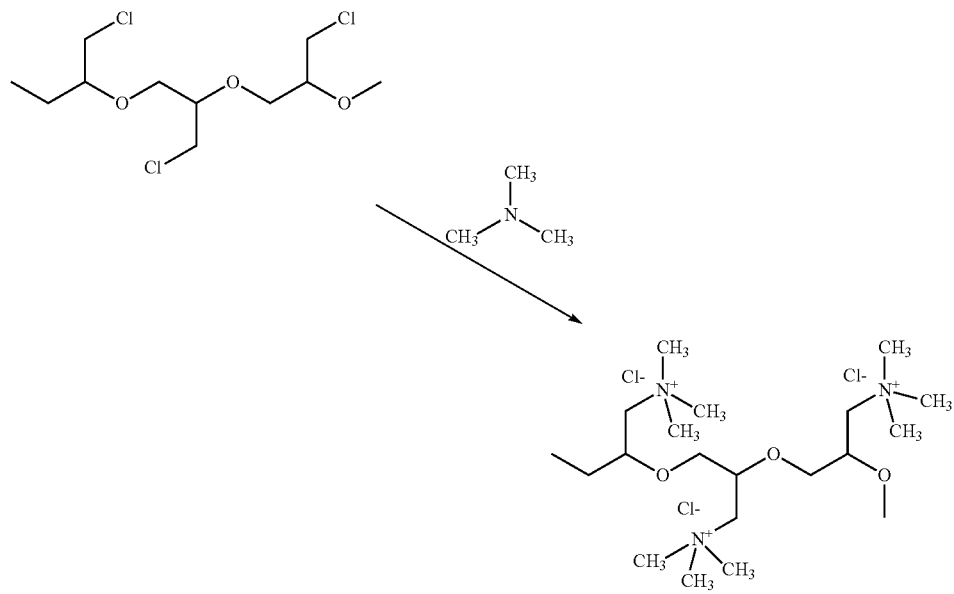

Reaction 5

The tertiary amines may be simple as shown in Reaction 5 or may more complex, such as, for example, the tertiary amines such as 1,1',1",1"'-(ethane-1,2-diylbis(azanetriyl)) tetrakis(propan-2-ol), or such as 1,1',1",1"'-((((2-hydroxypropyl)azanediyl)bis(ethane-2,1-diyl))bis(azanetriyl))tetrawhich intermediate can be reacted with any tertiary amine via a reaction such as Reaction 6 illustrated below in an exemplary version wherein the general tertiary amine is illustrated for simplicity as a trimethylamine:

Reaction 6

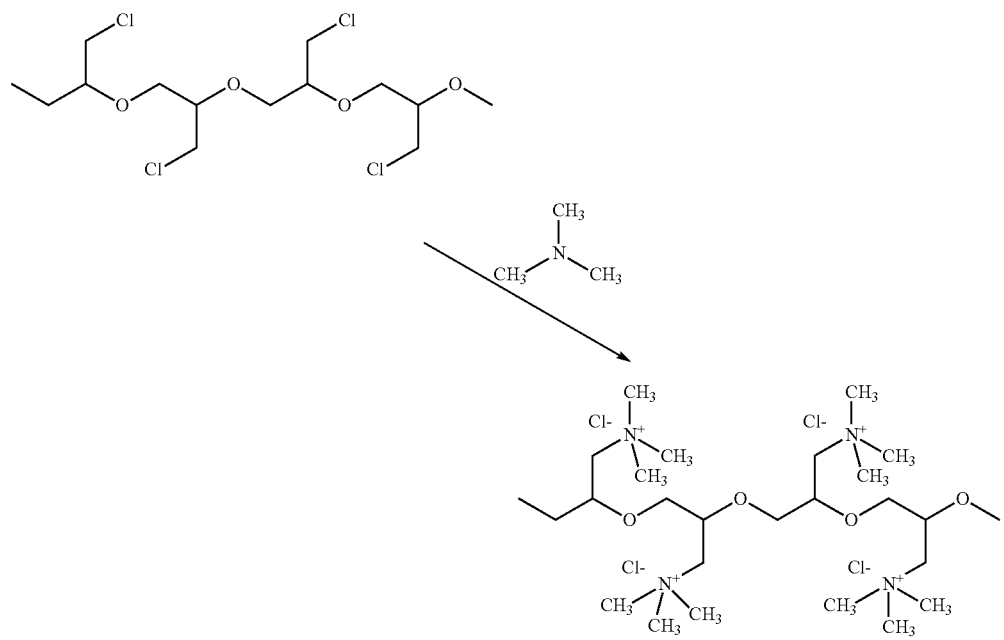

The tertiary amines may be simple as shown in Reaction 6 or may more complex, such as, for example, the tertiary amines such as 1,1',1",1"'-(ethane-1,2-diylbis(azanetriyl))tetrakis(propan-2-ol), or such as 1,1',1",1"'-((((2-hydroxypropyl)azanediyl)bis(ethane-2,1-diyl))bis(azanetriyl))tetrakis(propan-2-ol), as disclosed herein. The cations produced by such reactions are tetraquaternary ammonium cations or tetraamminium cations of molecular weight ranging from about 490 Daltons to well over 2200 Daltons, depending on the alkyl groups' sizes. Reaction 6 is shown as a single step with all four of the tertiary amine reagent groups being the same and leading to all four nitrogens being quaternized in the same way; but Reaction 6 can be carried out in four steps with a the same or a different tertiary amine in each step. The salts shown in Reaction 6 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like.

Yet other examples of oligomeric quaternary amines useful in accordance with the presently claimed invention include derivatives of alkyl pentahalides such as 3,6,9,12,15-pentakis(chloromethyl)-2,5,8,11,14-pentaoxaheptadecane, available from Corsicana Technologies, Inc. of Houston, Tex., which intermediate can be reacted with any tertiary amine via a reaction such as Reaction 7 illustrated below in an exemplary version wherein the general tertiary amine is illustrated for simplicity as a trimethylamine:

Reaction 7

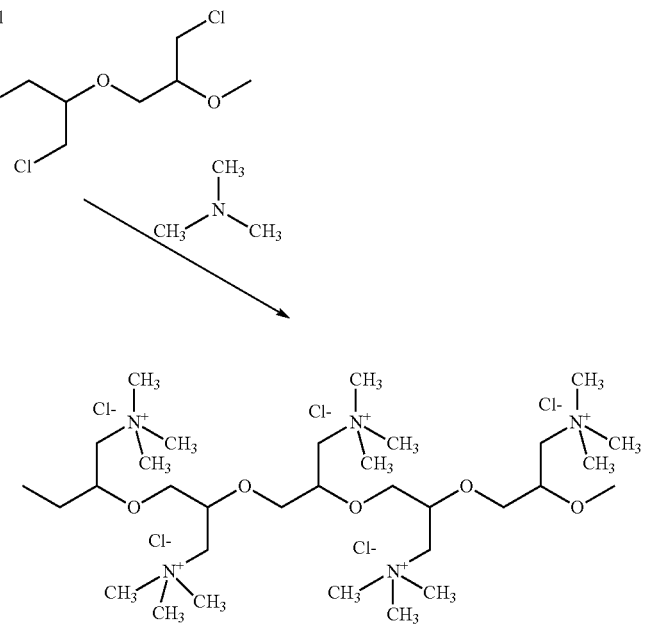

The tertiary amines may be simple as shown in Reaction 7 or may more complex, such as, for example, the tertiary amines such as 1,1',1'',1'''-(ethane-1,2-diylbis(azanetriyl)) tetrakis(propan-2-ol), or such as 1,1',1'',1'''-((((2-hydroxypropyl)azanediyl)bis(ethane-2,1-diyl))bis(azanetriyl))tetrakis(propan-2-ol), as disclosed herein. The cations produced by such reactions are tetraquaternary ammonium cations or tetraamminium cations of molecular weight ranging from about 830 Daltons to well over 5000 Daltons, depending on the alkyl groups' sizes. Reaction 7 is shown as a single step with all four of the tertiary amine reagent groups being the same and leading to all four nitrogens being quaternized in the same way; but Reaction 7 can be carried out in four steps with a the same or a different tertiary amine in each step. The salts shown in Reaction 7 are chlorides, but the counter ion for the quaternized nitrogens in accordance with the presently claimed invention can be selected from any of the other halides, borate, carbonate, bicarbonate, nitrate, phosphate, hydrogen phosphate, dihydrogen phosphate, sulfate, hydrogen sulfate, thiosulfate, hydrogen thiosulfate, acetate, propionate, butyrate, succinate, phenolate, and the like.

Other embodiments within the scope of the presently claimed invention are those where 1,3-bis(3-chloropropyl) urea; 1-chloro-2-(3-chloro-2-methoxypropoxy)butane dihalides; 1-chloro-2-(3-chloro-2-(3-chloro-2-methoxypropoxy) propoxy)butane trihalide; 3,6,9,12-tetrakis(chloromethyl)-2,5,8,11-tetraoxatetradecane tetrahalide; or 3,6,9,12,15-pentakis(chloromethyl)-2,5,8,11,14-pentaoxaheptadecane pentahalide, disclose herein, is replaced with other alkyl-, aryl-, alkaryl-, or aralkyl-dihalides, alkyl-, aryl-, alkaryl-, or aralkyl-trihalides, alkyl-, aryl-, alkaryl-, or aralkyl-tetrahalides, alkyl-, aryl-, alkaryl-, or aralkyl-pentahalides, or alkyl-, aryl-, alkaryl-, or aralkyl-hexahalides.

Other diquaternary amines, available from Corsicana Technologies, Inc. of Houston, Tex., and suitable for use in accordance with the presently claimed invention include $N^1,N^1,N^2,N^2$-tetrakis(2-hydroxyethyl)-$N^1,N^2$-dimethylethane-1,2-diaminium dichloride:

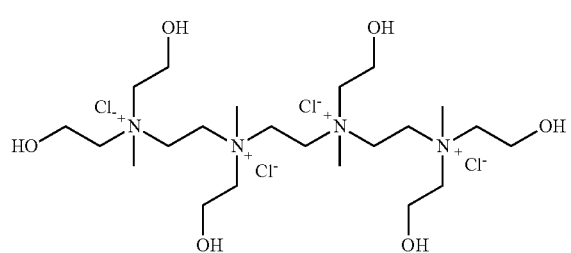

Other tetraquats, available from Corsicana Technologies, Inc. of Houston, Tex., and suitable for use in accordance with the presently claimed invention include $N^1,N^{1'}$-(ethane-1,2-diyl)bis($N^1,N^2,N^2$-tris(2-hydroxyethyl)-$N^1,N^2$-dimethylethane-1,2-diaminium)tetrachloride:

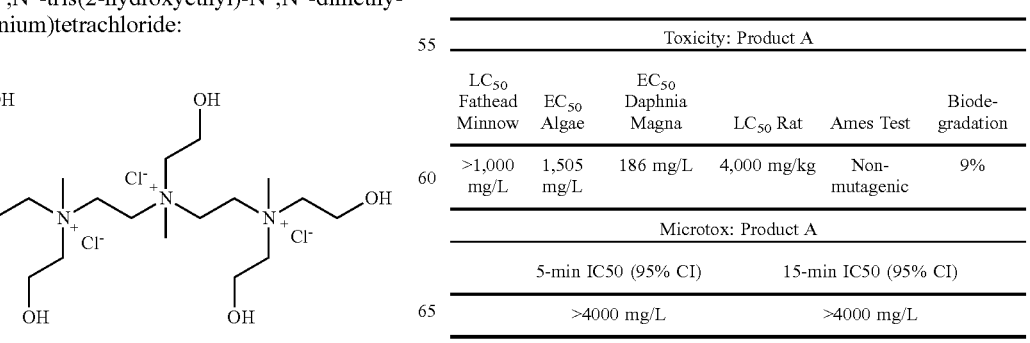

The SLE agents of the presently claimed invention may be used with a variety of known scale inhibitors and scale inhibitor chemistries. For example, the scale inhibitor may be selected from BHMT phosphonate, DETA phosphonate, a phosphorus-containing polycarboxylate, a phosphorus-containing polymer, a sulfonated polyacrylate, and combinations thereof.

EXAMPLES

In the following Examples, references to Products A through G are used for convenience. The Table below identifies the composition of Product A, which is a scale squeeze life extention (SLE) agent in accordance with the presently claimed invention, as well as the composition of Products B through G, which are commercially available scale inhibitors. Product A is 1,3-propandiaminium, 2-hydroxy-N,N,N,N',N',N'-hexamethyl-, dichloride. Product B is a BHMT phosphonate. Product C is a proprietary DETA phosphonate available from Corsicana Technologies, Inc. of Houston, Tex. Product D is a proprietary phosphorous-containing polycarboxylate available from Corsicana Technologies, Inc. of Houston, Tex. Product E is a proprietary phosphorous-containing polymer available from Corsicana Technologies, Inc. of Houston, Tex. Product F is a proprietary phosphorous-containing polymer available from Corsicana Technologies, Inc. of Houston, Tex. Product G is a proprietary sulfonated polyacrylate available from Corsicana Technologies, Inc. of Houston, Tex. The scale inhibitors referred to as Products B through G are all commercially available products with proven track records for use in scale squeeze treatments in the field. Products B and C are phosphonate chemistries, while Products D, E, F and G are polymeric materials appropriate for use in the oilfields in the North Sea.

TABLE

Product Identification

| Product | Composition |
|---|---|
| A | 1,3-propandiaminium, 2-hydroxy-N,N,N,N',N',N'-hexamethyl-, dichloride |
| B | BHMT phosphonate |
| C | DETA phosphonate |
| D | Phosphorous-containing polycarboxylate |
| E | Phosphorous-containing polymer |
| F | Phosphorous-containing polymer |
| G | Sulfonated polyacryate |

Example 1—Environmental Evaluation

Product A was evaluated for toxicity using various tests. The results of these tests are shown the tables below:

| Toxicity: Product A | | | | | |
|---|---|---|---|---|---|
| $LC_{50}$ Fathead Minnow | $EC_{50}$ Algae | $EC_{50}$ Daphnia Magna | $LC_{50}$ Rat | Ames Test | Biodegradation |
| >1,000 mg/L | 1,505 mg/L | 186 mg/L | 4,000 mg/kg | Non-mutagenic | 9% |

| Microtox: Product A | |
|---|---|
| 5-min IC50 (95% CI) | 15-min IC50 (95% CI) |
| >4000 mg/L | >4000 mg/L |

Example 2—Compatibility Test with Product A

Individual solutions (Solutions 1B through 1G) of 10% Product B, C, D, E, F and G, respectively, in a synthetic brine (see the table below showing the synthetic brine composition) were mixed with a 10% solution (Solution 2) of Product A in the synthetic brine. The two sets of solutions were mixed with Solution 2 (i. e., each of Solutions 1B through 1G were mixed with Solution 2) at ratios of 10:90, 30:70, 50:50, 70:30 and 90:10 to indicate that no precipitate would form at any concentration in the mixing concentration range from 10:90 to 90:10. These compatibility screening tests indicate that it is unlikely for any incompatibility to be experienced during deployment and flow back of a squeeze treatment. Any incompatibilities under ambient conditions were observed visually from solution clarity and/or precipitate. The samples were then heated to the test temperature (80° C.) and any further incompatibilities after 2 and 24 hours recorded.

| Synthetic Brine Composition | |
|---|---|
| Ions | Synthetic Brine (mg/L) |
| Sodium | 9000 |
| Calcium | 250 |
| Magnesium | 50 |
| Potassium | 200 |
| Strontium | 25 |
| Barium | 60 |
| Chlorides | 14300 |

All scale inhibitors tested were shown to be fully compatible as a 10% solution, with a 10% solution of Product A, at a variety of ratios, with the exception of Product D.

| Clarity of Mixed Solutions | | | | | |
|---|---|---|---|---|---|
|  | 10:90 | 30:70 | 50:50 | 30:70 | 10:90 |
| Product B | C | C | C | C | C |
| Product C | C | C | C | C | C |
| Product D | P | P | P | P | C |
| Product E | C | C | C | C | C |
| Product F | C | C | C | C | C |
| Product G | C | C | C | C | C |

*Note:
C—Clear, P—Precipitate

Example 3—Static Adsorption Tests

Adsorption tests were carried out using 16 g of washed Ottawa sand. Thirty-two milliliters of the synthetic brine solution of Example 2 was added to the sand and allowed to saturate for 1 hour. Twenty-five milliliters of solution were replaced with a 10% solution of scale inhibitor Products B, C, D, E, F and G in separate tests. The jars were incubated at 80° C. for 24 hours, prior to subsampling and analysis for residual scale inhibitor. Blanks and controls (without scale inhibitor and without sand respectively) were also prepared, incubated for 24 hours and subsampled.

Figure 2:
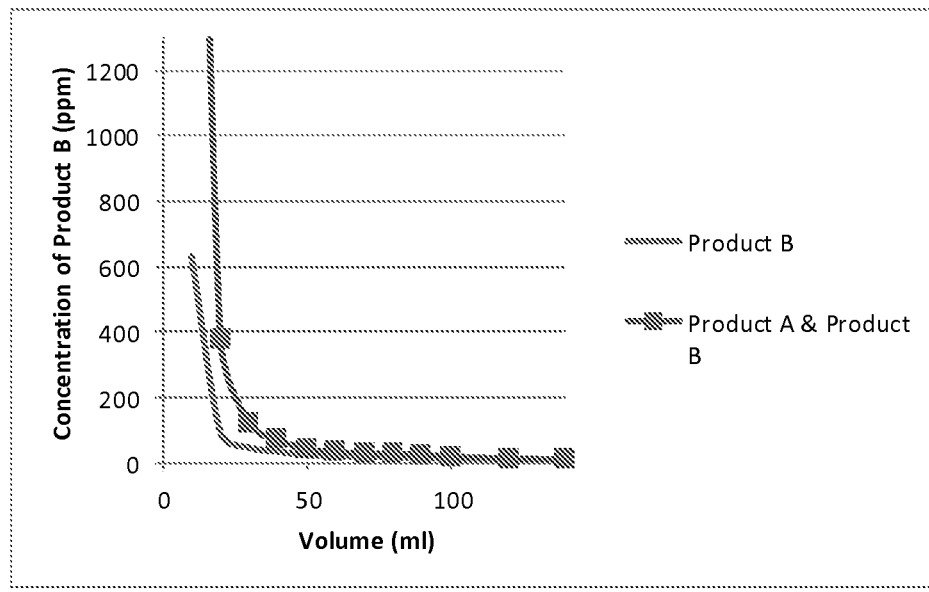
FIG. 2 is a graph of the concentration of Product B as a function of the brine volume flowing through a mixture of crushed core and sand, where Product B was introduced alone or following the introduction of Product A.
Figure 3:
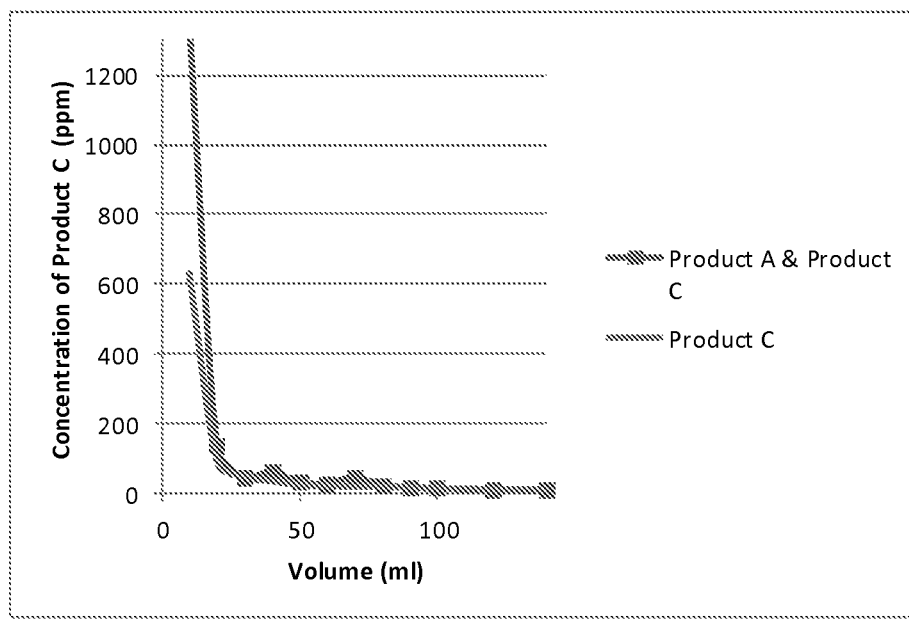
FIG. 3 is a graph of the concentration of Product C as a function of the brine volume flowing through a mixture of crushed core and sand, where Product C was introduced alone or following the introduction of Product A.
Figure 4:
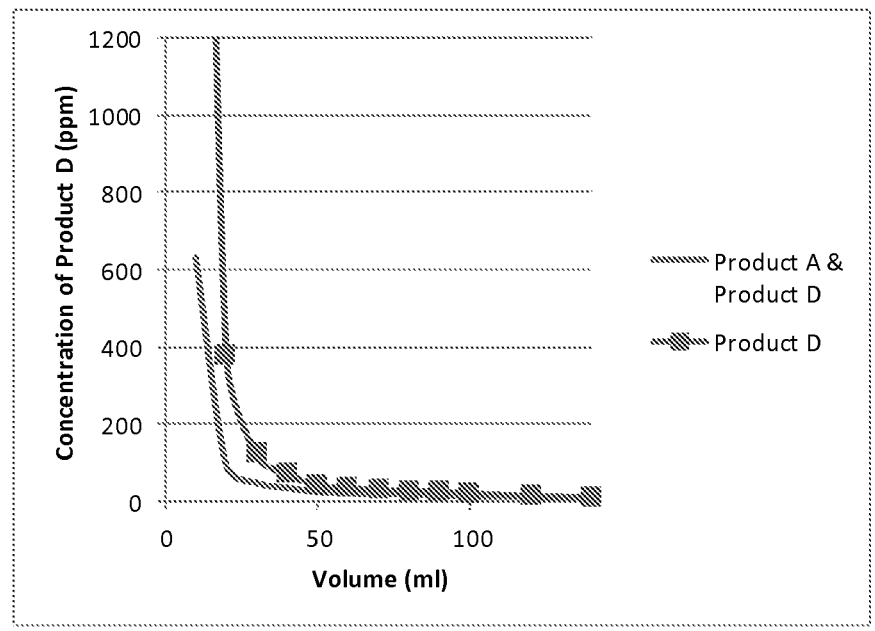
FIG. 4 is a graph of the concentration of Product D as a function of the brine volume flowing through a mixture of crushed core and sand, where Product D was introduced alone or following the introduction of Product A.
Figure 5:
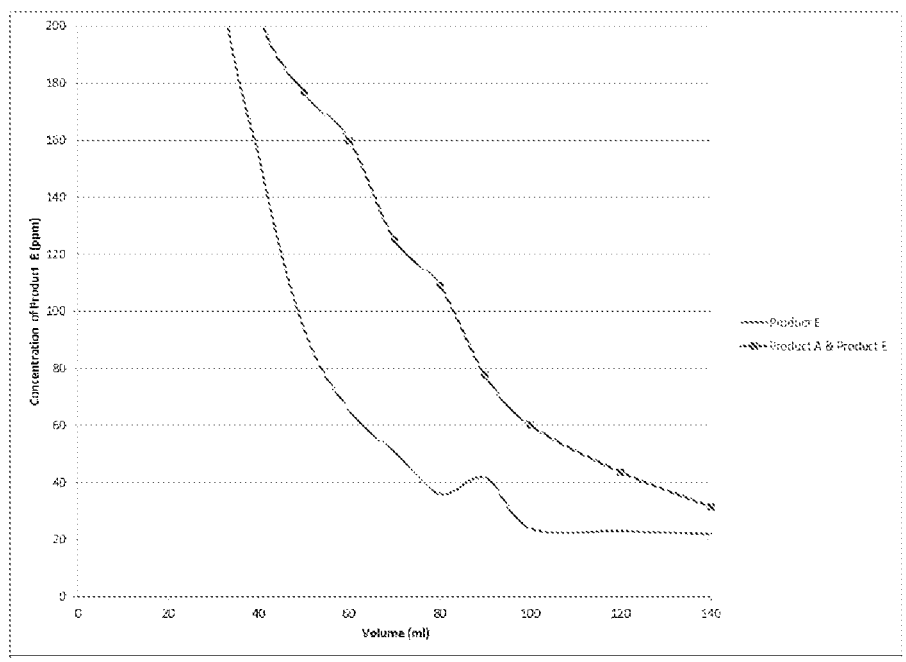
FIG. 5 is a graph of the concentration of Product E as a function of the brine volume flowing through a mixture of crushed core and sand, where Product E was introduced alone or following the introduction of Product A.
Figure 6:
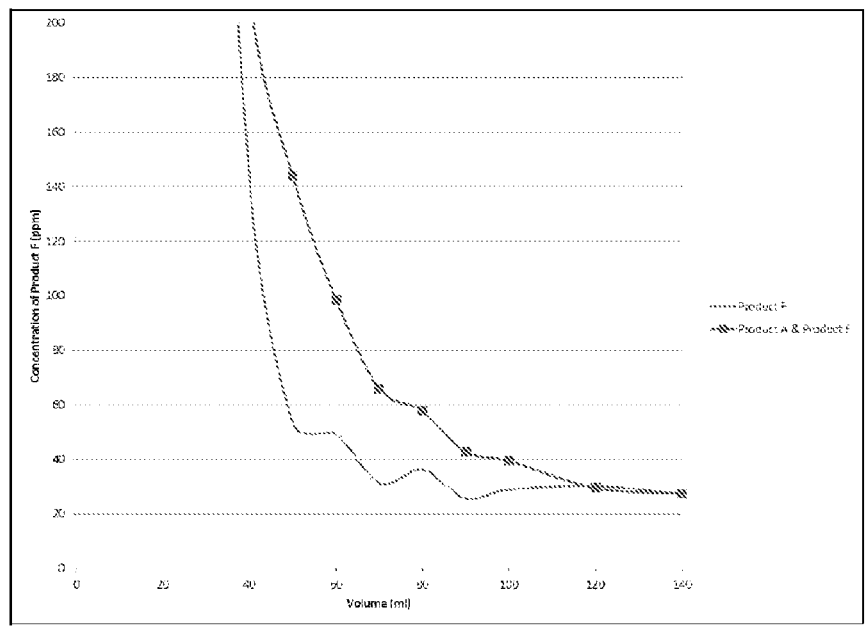
FIG. 6 is a graph of the concentration of Product F as a function of the brine volume flowing through a mixture of crushed core and sand, where Product F was introduced alone or following the introduction of Product A.

The tests were repeated initially replacing 5 mL of NaCl solution with 10% solution of squeeze life extender Product A. The jars where incubated for 5 hours prior to replacing 25 mL of solution with the 10% solutions of the scale inhibitors. Calculations were carried out to determine the percentage adsorption of each scale inhibitor with and without the Product A spearhead solution, (see FIG. 2).

Static adsorption testing demonstrated an enhanced adsorption for all scale inhibitor products, with the exception of Product D. The degree of enhanced adsorption was greatest for the phosphonate scale inhibitors, Product B and C, with a 75-80% increase in adsorption, when compared to the phosphonates tested alone. The adsorption of the polymeric species of Products E, F and G was shown to be 12-40% greater than the polymeric species alone. Results are shown in Table 1, with graphical data in FIG. 1. FIG. 1 is a bar graph of the amount of scale inhibitors (Products B through G) that were absorbed on sand with and without Product A.

TABLE 1

Static Adsorption Results for Products B-G with and without Product A.

| Chemical | Chemical Absorbed per Gram of Sand With No Product A | Chemical Absorbed per Gram of Sand with Product A | Percentage Absorption Increase |
|---|---|---|---|
| B | 3.91 | 7.14 | 82.5% |
| C | 7.52 | 13.15 | 74.8% |
| D | 4.29 | 4.39 | 2.3% |
| E | 25.27 | 28.45 | 12.6% |
| F | 5.79 | 7.88 | 36.2% |
| G | 16.38 | 23.10 | 41% |

Example 4—Gravity Feed Crushed Rock Adsorption Test

A variation on the standard adsorption test was carried out. Glass wool was tightly packed into the bottom of a burette, to which was added 3 to 4 g of sieved Ottawa sand and 15 g of a sieved sample of crushed core/sand mix (See Table below for composition). Twenty milliliters of synthetic brine (pH 5.2, unbuffered) was added to the burette and allowed to flow slowly through the core material. The core column was allowed to saturate in brine for 2 to 3 days. The brine was drained to the top of the core material prior to addition of the scale inhibitors. In separate tests, 20 mL of synthetic brine followed by 20 mL of a 10% solution of Products B, C, D, E and F were added to the burettes. The burettes were sealed and allowed to sit overnight. Brine was then added to the burette and the solutions allowed to flow slowly through the burette. Ten milliliter samples of effluent from the burette were collected and analyzed for residual scale inhibitor.

The test was repeated using 20 mL of a 10% solution of Product A in synthetic brine as a spearhead. This solution was allowed to saturate for 1 hour, prior to draining and 20 mL of the scale inhibitor solutions being added to the burettes. The burettes were sealed and allowed to sit overnight. Brine was then added to the burette and the solutions allowed to flow slowly through the burette. Ten milliliter samples of effluent were collected and analyzed for residual scale inhibitor.

The foregoing gravity feed adsorption test allowed a dynamic aspect to be introduced to the testing of the ability of Product A to act as a squeeze life extension agent and provided a qualitative assessment of the ability for the scale inhibitor to desorb from the solid media.

All products were seen to have an enhanced adsorption profile when the column of crushed core was pre-treated with Product A. This was determined by the desorption profile of the scale inhibitor being slower with the squeeze life extender Product A than without Product A.

FIGS. 2 through 6 are graphs of the concentration of the scale inhibitors referred to as Products B through F, respectively, as a function of the brine volume flowing through a mixture of crushed core and sand, where Product B was introduced alone or following the introduction of Product A. The scale inhibitor return curves for this test clearly show the profile of the scale inhibitor with Product A are to the right of those without. This indicates a greater retention of the scale inhibitor on the core material when treated with Product A, than without, leading to the conclusion that Product A does offer squeeze life extension properties to both phosphonate and polymer chemistries.

Example 5—Coreflood

Two corefloods were carried out simultaneously on two Bandera outcrop cores (1.5" diameter by 3" length), using a Scaled Solutions dual coreflood apparatus. The composition of these cores is set out in the table below:

| Core Composition of Bandera Sandstone | |
|---|---|
| Component | Weight percent |
| Quartz | 57 |
| Plagioclase | 12 |
| K-feldspar | nd |
| Calcite | nd |
| Dolomite | 16 |
| Pyrite | tr |
| Mica + illite | 10 |
| Kaolinite | 3 |
| Chlorite | 1 |

Core Preparation

Both cores were wrapped with PTFE tape and cased in heat shrink tubing prior to insertion into a Viton sleeve and mounted in a Hassler type core holder with a confining pressure of 1200 psi. Both cores were then flushed with synthetic brine at 1 mL/min for at least 2 hours and until the differential pressure was stable. Brine was flushed at 0.5 mL/min overnight.

Pre-Treatment Measurements

Both cores were saturated with synthetic brine under ambient conditions in the forward direction at 1 mL/min for 10 minutes, 2 mL/min for 10 minutes, 3 mL/min for 10 minutes, and 4 mL/min for 2 hours and until the differential pressure was stable. After a stable differential pressure was achieved, the permeability to brine was measured in the forward flow by flooding at 4, 3, 2, 1 mL/min at room temperature.

Brine was then injected into both cores in the forward direction at 1 mL/min until the oven reached a temperature of 80° C. The cores were each saturated with synthetic brine by injecting in the forward direction at 1 mL/min for 10 minutes, 2 mL/min for 10 minutes, 3 mL/min for 10 minutes, and 4 mL/min for 2 hours and until the differential pressure was stable. Following plug saturation, the permeability of each core to synthetic brine was measured in the forward flow by flooding at 4, 3, 2, and 1 mL/min at 80° C.

The pore volume of each core was then determined by injecting a solution of 50 mg/L lithium in synthetic brine into each core for 30 minutes at 1 mL/min with 0.5 mL effluent samples collected by an auto sampler. After 30 minutes, synthetic brine was flushed for 30 minutes at 1 mL/min with 0.5 mL effluent samples collected. The samples were inductively coupled plasma analysis (ICP) to determine the pore volume of each core.

Spearhead Injection

A first core (Core 1) was injected with three pore volumes of a 10% solution of Product A in synthetic brine at a flow rate of 2 mL/min at 80° C. in the reverse direction. The second core (Core 2) was injected with three pore volumes of synthetic brine at a flow rate of 2 mL/min at 80° C. in the reverse direction.

Scale Inhibitor Pill Injection

Core 1 and Core 2 were then each injected with ten pore volumes of a 10% solution of Product B containing 50 mg/L of a lithium tracer in synthetic brine at a flow rate of 2 mL/min at 80° C. in the reverse direction. Both cores were then shut in overnight.

Post Flush

Both cores were injected with synthetic brine at 2 mL/min with effluent samples being collected. The samples were analyzed by ICP. Samples were collected and analyzed until the residual scale inhibitor concentration was below the minimum inhibitor concentration.

Post Treatment Measurements

Brine was injected into each core in the forward direction at 4 mL/min until the differential pressure was stable in order to saturate each core with brine. Following saturation, the permeability of each core to synthetic brine was measured in the forward flow by flooding at 4, 3, 2, and 1 mL/min at 80° C.

In order to determine the post treatment pore volume of both cores, a solution of 50 mg/L lithium in synthetic brine was injected into each core for 30 minutes at 1 mL/min with 0.5 mL effluent samples collected by an auto sampler. After that, synthetic brine was flushed for 30 minutes at 1 mL/min with 0.5 mL samples collected. Each of these samples was analyzed by ICP to determine the pore volume.

Results and Conclusions

The foregoing static adsorption test and gravity fed adsorption test were used to assess the potential of a spearhead injection (preflush) including the squeeze life extension (SLE) agent to enhance adsorption of scale inhibitors when compared to absorption of the individual scale inhibitors alone. The performance of Product A as a squeeze life extension agent was confirmed through the coreflood experiments described above. The coreflood experiments also confirm that Product A poses no threat of formation damage when deployed alongside a scale inhibitor.

A series of saturations and measurements were carried out using multi-rate flow to allow the permeability of each core to be calculated using Darcy's Law. The effective or absolute liquid permeability is obtained from Darcy's Law for single phase flow:

$$k = \frac{Q \mu L}{\Delta P A}$$

Where:
Q=flow rate (cc/sec)
k=permeability (Darcy)
ΔP=differential pressure (atm)
A=core cross sectional area (cm$^2$)
μ=fluid viscosity at test temperature (cp)
L=core length (cm)

In practice, a multi-rate experiment is performed to obtain ΔP as a function of Q. The equation above is then re-arranged in the form y=mX+c so that a plot of flow rate (Q)

versus $(\Delta P \cdot A)/(\mu \cdot L)$ will give the permeability as the slope 'm' and transducer offset as the intercept 'c'.

A comparison of the permeability before treatment to the permeability after treatment for both experiments showed excellent recovery. The experiment showed no formation damage, and a recovery in permeability of 75% when only the Product B scale inhibitor was used. When Product A was deployed as a spearhead ahead of Product B, the permeability recovery was 83%, indicating that the use of this combination would not be a risk to the formation. These results are shown in Table 2.

TABLE 2

Permeability Comparison, Pre and Post Treatment with Product A/Product B.

| Experiment/ Flow Direction | Spearhead/Main Pill | Pre-treatment Permeability (mD) | Flow back Permeability (mD) | Recovery (%) |
|---|---|---|---|---|
| Core 1 (FF) | 10% Product A/ 10% Product B | 6 | 5 | 83% |
| Core 2 (FF) | Brine/10% Product B | 4 | 3 | 75% |

Lack of formation damage was confirmed by pore volume measurements taken before and after chemical injection. Table 3 shows 100% recovery of pore volume for the coreflood with Product A/Product B.

TABLE 3

Pore Volume Comparison, Pre and Post Treatment with Product A/Product B.

| Experiment/ Flow Direction | Spearhead/Main Pill | Pre-treatment Pore Volume (ml) | Post Treatment Pore Volume (ml) | Recovery (%) |
|---|---|---|---|---|
| Core 1 (FF) | 10% Product A/ 10% Product B | 22.5 | 22.5 | 100% |
| Core 2 (FF) | Brine/10% Product B | 23.5 | 23.5 | 100% |

Figure 7:
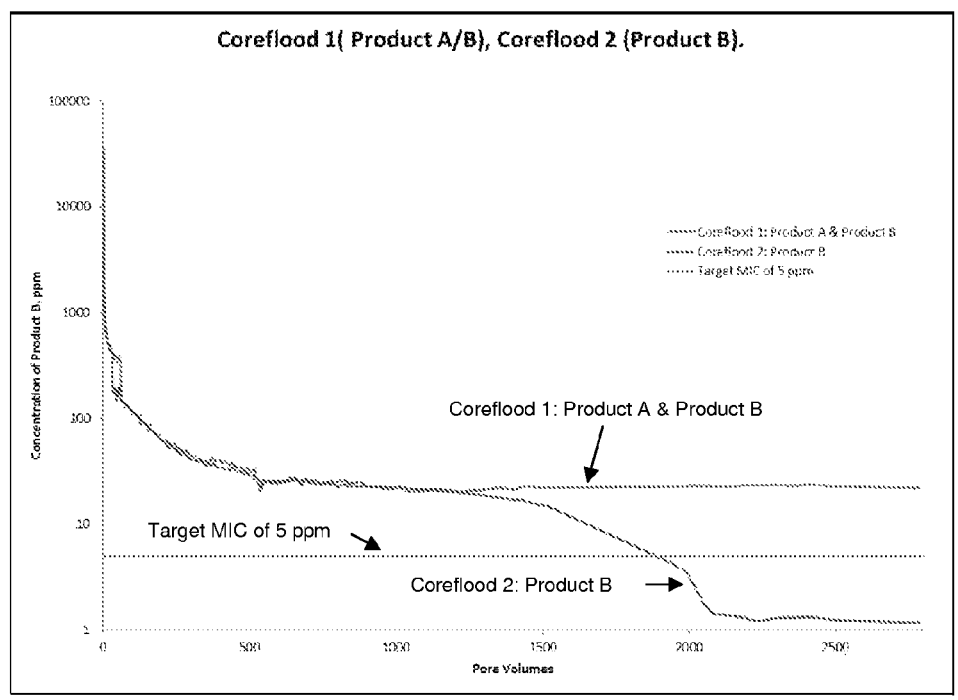
FIG. 7 is a graph of Product B concentration as a function of the number of pore volumes of brine that had passed through the core, where Product B was introduce alone or in combination with Product A.

FIG. 7 is a graph of Product B concentration as a function of the number of pore volumes of brine that had passed through the core, where Product B was introduce alone (Core 2) or in combination with Product A (Core 1). Deploying Product A as a spearhead in the coreflood was shown to improve the squeeze life afforded by Product B. The return curve of FIG. 7 for Product A/Product B shows a greater retention of the scale inhibitor. Product B alone was seen to drop below the pre-determined minimum acceptable inhibitor concentration (MIC) of 5 ppm, after 1900 pore volumes. By contrast, when the spearhead of Product A was used with Product B, the MIC had not been reached after 2500 pore volumes. The return curve for coreflood 1 has a plateau at approximately 20 mg/L, compared to 1 mg/L for the scale inhibitor alone. The squeeze life extension agents of the presently claimed invention have been shown to be capable of cation exchange on the negatively charged sites on the surface of clay and/or sand found in oil-bearing formations (i.e., smectite, kaolinite, illite, and mixed layer versions of these), thereby displacing a cation previously adsorbed on the clay surface. However, the SLE agents are themselves resistant to subsequent displacement through cation exchange and are thus more permanent.

Core floods have been run using commercially available scale inhibitors in the presence of the new products generating results that show dramatically improved squeeze lifetimes. Unlike some of the products currently in use, these new SLE agents possess a much better environmental profile, because these SLE agents are biodegradable and non-bioaccumulating and have much lower toxicity. While providing much longer effective squeeze lifetimes, the SLE agents are not so permanently adsorbed onto the rock surface. The improved SLE agents are thermally stable to 180° C. (~350° F.) allowing use in a wide range of locations.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the presently claimed invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of inhibiting scale in a subterranean formation, comprising:
   pretreating the subterranean formation with a squeeze life extension agent comprising a nonpolymeric diquaternary amine salt; and then
   introducing a scale inhibitor pill into the subterranean formation, wherein the scale inhibitor pill includes one or more scale inhibitors, and wherein squeeze lifetime of the scale inhibitor pill is extended as compared to the same method without the pretreating step.

2. The method of claim 1, wherein the nonpolymeric diquaternary amine salt has a cation with a molecular weight of from about 170 to 1500.

3. The method of claim 1, wherein the nonpolymeric diquaternary amine salt is introduced into the formation in a brine solution having a nonpolymeric diquaternary amine salt concentration of from 0.1 to 20 weight percent.

4. The method of claim 3, wherein the one or more scale inhibitors comprises BHMT phosphonate, DETA phosphonate, a phosphorus-containing polycarboxylate, a phosphorus-containing polymer, or a sulfonated polyacrylate.

5. The method of claim 1, wherein the nonpolymeric diquaternary amine salt is thermally stable to 180° C.

6. The method of claim 1, wherein the nonpolymeric diquaternary amine is symmetrical.

7. The method of claim 1, wherein the nonpolymeric diquaternary amine is non-symmetrical.

8. The method of claim 1, wherein the nonpolymeric diquaternary amine salt is:
   (a) 1,3-propandiaminium, 2-hydroxy-N,N,N,N',N',N'-hexamethyl-, dichloride;
   (b) 1,3-propandiaminium, 2-hydroxy-N-(2-hydroxyethyl),N,N,N',N',N'-pentamethyl-, dichloride; or
   (c) 1,3-propandiaminium, 2-hydroxy-N,N-(2-hydroxyethyl),N,N',N'N'-tetramethyl-, dichloride.

9. The method of claim 8, wherein the nonpolymeric diquaternary amine salt is introduced into the subterranean formation in a brine solution having a nonpolymeric diquaternary amine salt concentration of from 0.1 to 20 weight percent.

10. The method of claim 1, wherein the one or more scale inhibitors is a phosphonate.

11. The method of claim 10, wherein the nonpolymeric diquaternary amine salt is introduced into the formation in a brine solution having a nonpolymeric diquaternary amine salt concentration of from 0.1 to 20 weight percent.

12. The method of claim 10, wherein the nonpolymeric diquaternary amine is thermally stable to 180° C.

13. The method of claim 10, wherein a cation of the nonpolymeric diquaternary amine is:
   (a) 1,3-propandiaminium, 2-hydroxy-N,N,N,N',N',N'-hexamethyl-;
   (b) 1,3-propandiaminium, 2-hydroxy-N-(2-hydroxyethyl),N,N,N',N',N'-pentamethyl-; or
   (c) 1,3-propandiaminium, 2-hydroxy-N,N-(2-hydroxyethyl),N,N',N'N'-tetramethyl-.

14. The method of claim 13, wherein the nonpolymeric diquaternary amine is introduced into the formation in a brine solution having a nonpolymeric diquaternary amine concentration of from 0.1 to 20 weight percent.

15. The method of claim 1, wherein the one or more scale inhibitors is a polymeric scale inhibitor.

16. The method of claim 1, wherein the step of pretreating the subterranean formation with a nonpolymeric diquaternary amine salt includes introducing the nonpolymeric diquaternary amine salt into the subterranean formation in a brine.

17. The method of claim 16, wherein the brine comprises water and one or more salts comprising a sodium halide, a calcium halide, or a magnesium halide, and wherein the brine has an electrical conductivity of greater than 0.1 mS/cm.

18. The method of claim 1, wherein a cation of the nonpolymeric diquaternary amine salt is:
   (a) 1,3-propandiaminium, 2-hydroxy-N,N,N,N',N',N'-hexamethyl-;
   (b) 1,3-propandiaminium, 2-hydroxy-N-(2-hydroxyethyl),N,N,N',N',N'-pentamethyl-; or
   (c) 1,3-propandiaminium, 2-hydroxy-N,N-(2-hydroxyethyl),N,N',N'N'-tetramethyl-.

19. The method of claim 18, wherein the nonpolymeric diquaternary amine salt is introduced into the formation in a brine solution having a nonpolymeric diquaternary amine salt concentration of from 0.1 to 20 weight percent.

20. The method of claim 1, wherein the one or more scale inhibitors comprises a scale inhibitor including at least one anionic group, a scale inhibitor including at least one phosphonate or phosphate ester group, or a polymeric scale inhibitor including at least one carboxylate, phosphonate, or phosphonate ester group.

21. The method of claim 20, wherein the step of pretreating the subterranean formation with a nonpolymeric diquaternary amine salt includes introducing the nonpolymeric diquaternary amine salt into the subterranean formation in a brine.

22. The method of claim 21, wherein the brine comprises water and one or more salts comprising a sodium halide, a calcium halide, or a magnesium halide, and wherein the brine has an electrical conductivity of greater than 0.1 mS/cm.

23. The method of claim 20, wherein the one or more scale inhibitors is a phosphonate.

24. The method of claim 20, wherein the one or more scale inhibitors is a polymeric scale inhibitor.

25. The method of claim 1, wherein the one or more scale inhibitors comprises a polymeric scale inhibitor derived from monomers of formulae (I) or (II):

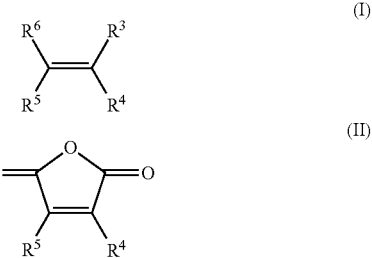

wherein:
   $R^3$ is $CO_2Z$, $SO_3Z$, $PO_3Z_2$, or an alkyl or aryl group substituted with at least one $CO_2Z$, $SO_3Z$ or $PO_3Z_2$ group in which Z is a hydrogen atom or a univalent metal atom; and
   $R^4$, $R^5$ and $R^6$ are each independently hydrogen, a substituted or unsubstituted alkyl or aryl group having from 1 to 8 carbon atoms, or an $R^3$ group.

26. The method of claim 25, wherein the nonpolymeric diquaternary amine salt is:
   (a) 1,3-propandiaminium, 2-hydroxy-N,N,N,N',N',N'-hexamethyl-, dichloride;
   (b) 1,3-propandiaminium, 2-hydroxy-N-(2-hydroxyethyl),N,N,N',N',N'-pentamethyl-, dichloride; or
   (c) 1,3-propandiaminium, 2-hydroxy-N,N-(2-hydroxyethyl),N,N',N'N'-tetramethyl-, dichloride.

27. The method of claim 1, wherein the one or more scale inhibitors comprises BHMT phosphonate, DETA phosphonate, a phosphorus-containing polycarboxylate, a phosphorus-containing polymer, or a sulfonated polyacrylate.

* * * * *